United States Patent [19]

Roy

[11] 3,929,971

[45] Dec. 30, 1975

[54] POROUS BIOMATERIALS AND METHOD OF MAKING SAME

[75] Inventor: Della M. Roy, State College, Pa.

[73] Assignee: Research Corporation, New York, N.Y.

[22] Filed: Mar. 30, 1973

[21] Appl. No.: 346,644

[52] U.S. Cl............... 423/308; 128/92 C; 3/1.9
[51] Int. Cl.². C01B 15/16; C01B 25/26; A61F 5/04
[58] Field of Search .................. 423/308–313; 128/92 C

[56] References Cited
UNITED STATES PATENTS

| | | | |
|---|---|---|---|
| 3,027,229 | 3/1962 | Towey et al. | 423/309 |
| 3,679,360 | 7/1972 | Rubin et al. | 423/308 |
| 3,737,516 | 6/1973 | Jenner | 423/308 |

OTHER PUBLICATIONS

Chem. Abstracts, 1955, 10110g.

Chem. Abstracts, 1964, 12282x.

*Primary Examiner*—Oscar R. Vertiz
*Assistant Examiner*—Gregory A. Heller
*Attorney, Agent, or Firm*—Cooper, Dunham, Clark, Griffin & Moran

[57] ABSTRACT

Synthetic material having a microstructure substantially corresponding to the microstructure of porous carbonate skeletal material of marine life and made up of hydroxyapatite or whitlockite is useful as a biomaterial. These synthetic materials are made by converting porous carbonate skeletal material of marine life into a phosphate skeletal material possessing a microstructure substantially the same as or corresponding to the microstructure of the carbonate skeletal source material by subjecting the carbonate skeletal material to hydrothermal chemical exchange with a phosphate.

45 Claims, No Drawings

POROUS BIOMATERIALS AND METHOD OF MAKING SAME

This invention relates to the production of synthetic material having a special microstructure. More particularly, this invention relates to synthetic materials, and the production thereof, useful as biomaterials, such as for the manufacture of prosthetic devices, bone implants and the like. The synthetic materials of this invention are also useful for other purposes, such as for catalyst support, for enzyme attachment and for special filter applications.

The replacement of damaged body tissue and bone with synthetic materials has long been an appealing possibility. Sterilized animal or human bone has not been satisfactory because of problems with residual organic matter which elicits immunological reactions. Another approach to the repair of replacement of fractured bone or damaged joints has been to fabricate prosthetic implants from materials compatible with body tissue and haing having mechanical properties. Screws, pins, nails and other items or shapes fashioned from highly polished alloys, such as Vitallium, a cobalt-chromium alloy having the approximate composition 65% Co, 35% Cr and 5% Mo, have been widely used but these implants often cause inflammation and excessive development of fibrous tissue. Corrosion of the metal and inability to induce long term mechanical attachment are further disadvantages. Attempts to increase the degree of tissue attachment by sintering a layer of metal spheres to the outer surface, such as to the outer surface of a Vitallium alloy implant, have been made. Sintered titanium fiber deposits have also been employed. Other potential prosthetic materials include phosphate-containing recrystallized glasses, phosphate-bonded alumina and porous ceramics. The difficulties in controlling pore size, and more important, in controlling the size of the connections between adjacent pores have been major limitations in the production and use of porous ceramics and prosthetic materials.

The patent literature describes many materials, and modes of preparation of such materials, proposed for the manufacture of prosthetic devices and anatomical replacements, see for example, U.S. Pat. Nos. 2,688,139, 3,041,205, 3,314,420, 3,387,925, 3,400,719, 3,526,005, 3,526,906, 3,563,925, 3,605,123 and 3,662,405.

Studies of implant or prosthetic materials have indicated that pore connections between 100 and 200 $\mu$m (microns) are necessary for the development of Haversian systems and the anastomosing blood supply which is essential for bone nourishment. Optimum pore sizes for the ingrowth of osteoid cells and fibrous tissue are 40–100 $\mu$m and 5–15 $\mu$m, respectively. Although uniform pore size and permeability are difficult to obtain in synthetic materials, materials which possess a uniform pore size and permeability are fairly common in nature. For example, most echinoderm skeletons are characterized by a pronounced three-dimensional fenestrate structure, see SCIENCE, 166, 1147 (1969). This article describes the microstructure of echinoderm skeletons which, as indicated hereinabove, are characterized by a pronounced three-dimensional fenestrate structure providing a periodic minimal surface. Such a surface divides space into two interpenetrating regions, each of which is a single multiply connected domain. According to this article the surface which is the interface between the solid calcite phase and the organic matter component provides maximum contact for crystal growth. The described microstructure appears to be unique to echinoderm skeletal materials.

Other porous skeletal materials of marine invertebrate life and investigations of such materials indicate that a considerable variety of microstructures might serve as the basis for the production of synthetic implant materials by structural replication. It has been proposed in co-pending, co-assigned application Ser. No. 291,547 filed Sept. 25, 1972 in the names of Eugene W. White, Jon N. Weber and Rodney A. White, now U.S. Pat. No. 3,890,107 to replicate or duplicate in negative or positive form the microstructures of such porous skeletal material in other materials which would possess some degree of biocompatability thereby, in effect, duplicating those natural materials having a desirable microstructure into another material which possesses better physical and/or chemical properties for use as biomaterials.

Of these other porous skeletal materials the most promising is the common scleractinian, reef-building colonial coral Porites whose skeleton is constructed of radiating clusters of acicular aragonite crystals (sclerodermites). The small (less than 2 mm) corallites, which are closely united without coenosteum, have both perforate skeletal walls and septa with perforations.

Examinations of the microstructures of echinoid spine calcite, Porites skeletal aragonite and human bone indicated that, except for a greater degree of orientation of the pores in the echinoid spine calcite and the Porites skeletal aragonite, the gross microstructural features of these three materials are similar. In human bone the pore volume ranges from about 90% in regions of low calcification to as low as 10% in the most heavily calcified areas. It would appear possible, therefore, to select in the animal kingdom a microstructure substantially corresponding to that of the microstructure of human bone. The disadvantages, however, of using naturally occurring skeletal materials directly as bone implants or bone replacements and other prosthetic devices, however, are the low strength and high solubility of the carbonate material, such as calcite and aragonite, which make up the bulk of the aforesaid marine skeletal materials. In the case of the hydroxyapatite of human bone which contains a substantial percentage of $CO_3$, see E. D. Pellegrino et al, Trans. Am. Clin. Climatol. Assoc. 76, 181 (1965), and vertebrate bone the difficulty and disadvantages reside in the removal therefrom of residual organic matter which elicits adverse immunological reactions.

Accordingly, it is an object of this invention to provide synthetic materials useful as biomaterials, such as for the manufacture of prosthetic devices and the like.

It is another object of this invention to provide a synthetic material having a microstructure substantially corresponding to the microstructure of human bone and the like.

It is yet another object of this invention to provide a synthetic material especially useful as a human bone implant.

Still another object of this invention is to provide a process for the manufacture of synthetic biomaterials, such as a synthetic material having a microstructure resembling that of human bone and the like.

How these and other objects of this invention are achieved will become apparent in the light of the accompanying disclosure. In at least one embodiment of the practice of this invention at least one of the foregoing objects will be achieved.

The carbonate making up the microstructure of porous permeable animal carbonate skeletal material, such as the porous, permeable carbonate skeletal material of marine life, e.g. the porous skeletal material of marine invertebrates, such as echinoid spine calcite and Porites skeletal aragonite (both calcite and aragonite being carbonates) has been converted into hydroxyapatite and whitlockite, while retaining the substantially corresponding or same microstructure, by hydrothermal chemical exchange with a phosphate. The resulting produced synthetic phosphate (hydroxyapatite or whitlockite) skeletal material possesses substantially the same microstructure of the original carbonate skeletal material from which it was derived. These synthetic materials are useful for the manufacture of prosthetic devices, such as body and bone implants, tooth fixation, massive hard tissue replacements and the like since hydroxyapatite is a biocompatible material and whitlockite is also biocompatible although tending over a period of time to be eliminated or replaced. Accordingly, synthetic material made up of whitlockite in accordance with this invention would be useful as a temporary prosthetic implant since it is slowly (period of months) disintegrated or reabsorbed in the body.

Although emphasis has been placed in the disclosure of this invention with respect to the utility of the specially produced synthetic materials as biomaterials, the materials of this invention would also be useful for the fabrication of special filters, catalyst supports, means for the immobilization and/or stabilization of catalytic agents, including enzymes, for carrying out specific chemical reactions and for the production of other special devices or structures which require a porous, permeable microstructure having a pore size in the range about 5–500 microns.

The synthetic phosphate materials prepared in accordance with this invention, as indicated hereinabove, are particularly useful as biomaterials for use in the manufacture of prosthetic devices or for use as implants in human hard tissue and the like. The materials of this invention, particularly those made from porous carbonate (aragonite) skeletal material of marine life, since they are comprised predominantly of hydroxyapatite $Ca_{10}(PO_4)_6(OH)_2$ with some carbonate ($CO_3$) present, approximate the composition of the inorganic component of human hard tissue, i.e., human bone. Indeed, it would appear that the materials prepared in accordance with this invention are the nearest to human hard tissue as compared with any synthetic material yet available.

Materials of this invention would have a microstructure which is porous, completely interconnected, approximating the same pore size as human bone which would allow permeation of body fluids and blood cells thereinto. Materials in accordance with this invention could be prepared which would be suitable for root portions of tooth implants and mandibular restorations where it would permit rapid ingrowth of periodontal and hard tissue.

Since the synthetic materials of this invention are produced at elevated temperatures and pressures the resulting produced materials are sterilized during manufacture and would, of course, be capable of resterilization. Another feature of the special synthetic compositions of this invention is the ability of such materials to be converted to a wide variety of composite materials not yet heretofore available. The selection of the materials associated with the synthetic materials of this invention could be such as to optimize the performance of the resulting composite and/or basic synthetic materials prepared in accordance with this invention. Such other materials associated with or composited with the synthetic materials of this invention would include metals, organic polymers and collagen.

In the manufacture of the synthetic materials of this invention it would be desirable, before subjecting the naturally occurring porous carbonate skeletal material to hydrothermal chemical exchange with a phosphate, to first prepare the porous carbonate skeletal material by the removal of any organic material therefrom. A suitable technique for the removal of organic material from the porous skeletal material would be by immersion in a dilute (about 5%) aqueous solution of sodium hypochlorite. Usually an immersion time of about 30 hours is satisfactory for the removal of substantially all of the organic matter. Following this the material is rinsed, preferably in deionized water, and dried, such as at a temperature of about 90°C. Any suitable technique for the removal of organic material, such as the technique for the removal of organic matter from animal bone described in SCIENCE, 119, 771 (1954), might be employed. If desired, the organic-free carbonate skeletal material after conversion by hydrothermal chemical exchange with a phosphate to hydroxyapatite or whitlockite, if not already shaped, may be shaped into a desired form or structure, for example, cylinders, screws, nuts, bolts, pins, flat or curved plates and the like.

The conversion of porous carbonate skeletal material into the special synthetic materials of this invention is effected by hydrothermal chemical exchange operation or reaction carried out at an elevated temperature, such as a temperature in the range from about 100°C. to about 600°C., more or less, at corresponding high pressures, such as a pressure in the range between about 0.1 kilobar, about 1,500 psig, to about 5 kilobars, approximately 75,000 psig. Usually the hydrothermal chemical exchange of the carbonate skeletal material with the phosphate is substantially completed within a period of time in the range from about 1 hour to about 2 weeks, depending upon the temperatures and pressures involved, the concentration of the phosphate during the hydrothermal reaction and the nature of the phosphate and carbonate skeletal materials.

The chemical reactions which might be involved in the conversion of the carbonate skeletal material to a corresponding hydroxyapatite skeletal material are set forth in the accompanying illustrative chemical equations:

I  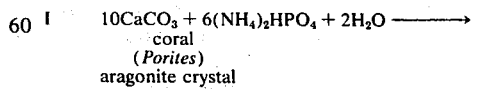
    coral
   (*Porites*)
  aragonite crystal
  structure
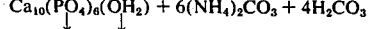
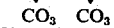
  OH-apatite
  with some $CO_3$
  substituted II  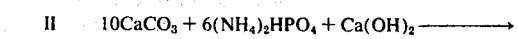

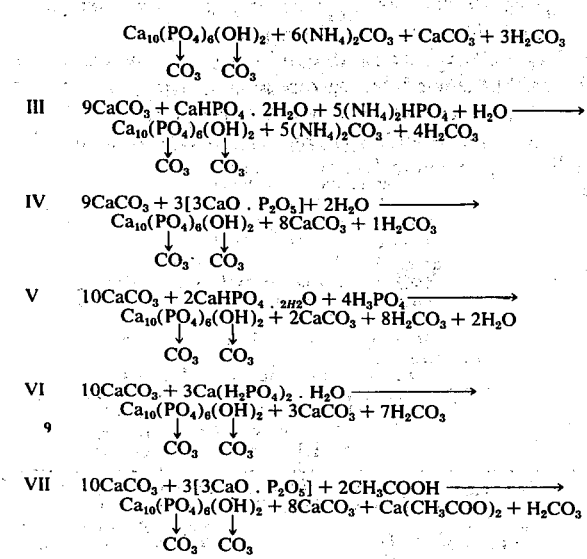

In all the above equations $\overset{\downarrow}{C}O_3$ means that some carbonate substitutes in the structure, hydroxyapatite and whitlockite. The amount may be approximately equivalent to that in human bone, such as in the range 0.1–10%, e.g. about 0.5% to about 4% by weight $CO_3$. The microstructure of the resulting formed hydroxyapatite material is substantially the same as that of the aragonite source material.

When the carbonate skeletal material is magnesium-rich calcite, e.g. above about 3% Mg, such as may be derived from the calcite spines of *Acanthaster planci*, upon hydrothermal chemical exchange in accordance with the practices of this invention, there is produced whitlockite, as indicated in the accompanying chemical equation:

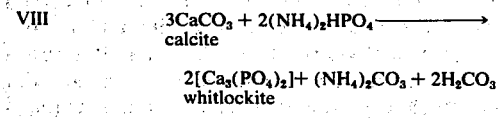

The microstructure of the resulting whitlockite skeletal material is very close, although somewhat finer, to that of the original calcite carbonate skeletal material from which it was derived.

The full explanation for the phenomenon observed that hydroxyapatite is formed from aragonite $CaCO_3$ by hydrothermal chemical exchange with a phosphate while whitlockite is formed from calcite $CaCO_3$ has not yet been determined. It appears, however, that where the porous carbonate skeletal material is made up of calcite which is magnesium-rich, such as the calcite spines of *Acanthaster planci*, the presence of magnesium is a factor and, indeed, magnesium is clearly associated with whitlockite. Up to 17 atom percent magnesium has been found to substitute for Ca in whitlockite while its solid solution in hydroxyapatite is very limited. In a hydrothermal chemical exchange reaction employing the same phosphate reactant aragonite carbonate skeletal material is converted to the corresponding hydroxyapatite skeletal material and magnesium-containing calcite carbonate skeletal material is converted to whitlockite whereas pure calcite, such as calcite crystal, is converted to hydroxyapatite.

In the hydrothermal chemical reaction for the conversion of the carbonate skeletal material to the corresponding hydroxyapatite or whitlockite skeletal material varying proportions of the reactants might be employed. It is desirable, however, that the necessary stoichiometric amounts of the reactants be present to bring the desired hydrothermal reaction to completion, i.e., the substantially complete conversion of the carbonate skeletal material to the corresponding hydroxyapatite or whitlockite material. In carrying out the hydrothermal chemical reactions in accordance with this invention it is useful to provide an excess of the phosphate reactant. Generally, satisfactory results are obtained for the preparation of hydroxyapatite and whitlockite materials in accordance with this invention when the reactant carbonate coral skeletal material, phosphate donor, e.g. $(NH_4)_2HPO_4$, and water are present in the relative proportions by weight 1:1:4, respectively. When the aforesaid materials are present in the aforesaid proportions and the hydrothermal chemical exchange reaction is carried out at a temperature of about 275°C. and at a pressure of 1 kilobar, i.e. 15,000 psig, and for a period of time of about 24 hours, substantially complete conversion of an aragonite carbonate skeletal material to the corresponding hydroxyapatite skeletal material, with some substitution of carbonate, is effected. The resulting produced hydroxyapatite material would then desirably be washed to removed any water-soluble residue, such as by a number of washings, e.g. five washings, by boiling in deionized water for about 5 minutes per washing, including decanting the wash water after each washing.

Various substantially water-soluble phosphates may be employed as the phosphate contributing reactant in the hydrothermal chemical exchange reaction to produce the special materials of this invention. Suitable such phosphates include the alkali metal phosphates, such as the sodium orthophosphates and potassium orthophosphates, the ammonium orthophosphates, including the acid phosphates and mixed phosphates. Also useful would be the calcium orthophosphates and the acid phosphates, as well as orthophosphoric acid including its hydrates and derivatives and mixtures of a weak acid, such as acetic acid, with a phosphate.

Useful orthophosphates and acid phosphates in the practices of this invention include $Li_3(PO_4)$, $LiH_2(PO_4)$, $Na_3(PO_4)$, $Na_2HPO_4$, $Na_3H_3(PO_4)_2$, $NaH_2(PO_4)$, $Na_4H_5(PO_4)_3$, $NaH_5(PO_4)_2$, $K_3PO_4$, $K_2HPO_4$, $K_7H_5(PO_4)_4$, $K_5H_4(PO_4)_3$, $KH_2(PO_4)$, $KH_5(PO_4)_2$, $(NH_4)_3PO_4$, $(NH_4)_2HPO_4$, $NH_4H_2PO_4$, $NH_4H_5(PO_4)_2$, $NH_4H_8(PO_4)_3$, and their hydrates, and mixed salts especially of K, $NH_4$ and Na orthophosphates and acid phosphates, including also Rb and Cs orthophosphates and acid phosphates. Also useful in addition to the aforementioned are the calcium orthophosphates $2CaO.P_2O_5$, $CaHPO_4$, $Ca_4P_2O_9$, $Ca(H_2PO_4)_2$ and $CaO.P_2O_5$.

Upon completion of the hydrothermal chemical exchange reaction it has been shown by examination, including optical microscopy and scanning electron microscopy, that the resulting three-dimensional completely interpenetrating porous structure is the same as the original carbonate structure from which it was derived. The original calcium carbonate (aragonite) crystal structure of the resulting produced material is absent as determined by x-ray diffraction and by optical microscopy.

As indicated, various porous carbonate skeletal material, particularly porous carbonate skeletal material of marine life, may be employed in the practices of this invention. Particularly useful, because of the vast quantities available, is the carbonate skeletal material of scleractinian coral Porites wherein the skeletal material is composed of the carbonate aragonite. Other corals of the genera Goniopora, Alveopora, Acropora and others may be suitable employed in the practice of this invention as the source of the carbonate skeletal material for conversion by hydrothermal chemical exchange with a phosphate into hydroxyapatite. Where the carbonate skeletal material is made up of a calcite carbonate marine skeletal material, such as echinoid spine calcite where the calcite contains a substantial amount of magnesium associated therewith, whitlockite is produced upon hydrothermal chemical exchange with a phosphate and the calcite structure is absent as determined by x-ray diffraction. If, however, a calcite carbonate porous skeletal material were to be employed which is substantially free of magnesium the resulting calcite carbonate skeletal material would be converted to hydroxyapatite rather than whitlockite. Both materials, however, hydroxyapatite and whitlockite, are useful materials, with the hydroxyapatite being preferred for the manufacture of a prosthetic device and the like.

The synthetic materials hydroxyapatite and whitlockite prepared in accordance with this invention have been found to be at least as strong as the original carbonate skeletal material from which they are derived, while at the same time mimicing human bone in both chemistry and microstructure. Since hydroxyapatite is harder (Mohs hardness = 5) than either aragonite (Mohs hardness = 3.5–4) or calcite (Mohs hardness = 3) there would be prepared structures which are stronger than the original material from which such structures are derived while retaining the microstructure of the source material. Further, when the carbonate skeletal material is made up of magnesium-containing calcite carbonate, such as the skeletal material of the asteroid *Acanthaster planci*, and this material converted in accordance with the practices of this invention by hydrothermal chemical exchange to form whitlockite $Ca_3(PO_4)_2$, the resulting produced synthetic material has been found to have finer micropores while retaining substantially the microstructure of its calcite carbonate source material, thereby providing a technique for controlling pore size.

The following is illustrative of the practices of this invention. Slices of massive scleractinian coral Porites and spines of the asteroid *Acanthaster planci* were used as starting materials to provide aragonite and calcite polymorphs of calcium carbonate, respectively. Hydrothermal techniques were employed for the chemical exchange of these carbonate materials with a phosphate. Sections of Porites coral and of *Acanthaster planci* spine together with weighed quantities of reactants and water (the source carbonate material being completely immersed in the resulting aqueous solution) were sealed in a gold tube, heated at elevated temperatures and pressures for periods of time varying from 12 hours to one week and the resulting reaction product cooled and examined. Upon examination it was found that essentially complete replacement of aragonite by phosphate material had been achieved. The porous interconnecting structures of the source materials were preserved. For example, hydroxyapatite replaced the original Porites aragonite carbonate and preserved its structure.

Typical experimental conditions for the exchange reactions carried out to produce hydroxyapatite and whitlockite are set forth in accompanying Table No. 1. In accordance with the practices of this invention the following exchange reactions take place:

$$10CaCO_3 + 6(NH_4)_2HPO_4 + 2H_2O \longrightarrow$$
Porites aragonite
$$Ca_{10}(PO_4)_6(OH)_2 + 6(NH_4)_2CO_3 + 4H_2CO_3$$
apatite $$3CaCO_3 + 2(NH_4)_2HPO_4 \longrightarrow$$
*Acanthaster planci*
$$2[Ca_3(PO_4)_2] + 2(NH_4)_2CO_3 + 2H_2CO_3$$
whitlockite TABLE No. 1

Hydrothermal Phosphate Exchange of Coral (*Porites*) and Echinoderm Spine Material (*Acanthaster planci*)

| Sample Number | Reactant | Temp. °C. | Pressure psi | Time hrs. |
|---|---|---|---|---|
| Coral | | | | |
| 1 | $(NH_4)_2HPO_4$ | 250 | 15,000 | 24 |
| 2 | $(NH_4)_2HPO_4$ | 260 | 15,000 | 12 |
| 3 | $(NH_4)_2HPO_4 + Ca(OH)_2$ | 250 | 15,000 | 24 |
| 4 | $(NH_4)_2HPO_4 + Ca(OH)_2$ | 260 | 15,000 | 48 |
| 5 | $(NH_4)_2HPO_4 + Ca(OH)_2$ | 350 | 15,000 | 24 |
| 6 | $(NH_4)_2HPO_4 + Ca(OH)_2$ | 270 | 15,000 | 24 |
| 7 | $(NH_4)_2HPO_4$ | 260 | 15,000 | 24 |
| 8 | $(NH_4)_2HPO_4$ | 180 | 15,000 | 24 |
| 9 | $(NH_4)_2HPO_4$ | 260 | 15,000 | 48 |
| Spine | | | | |
| 1 | $(NH_4)_2HPO_4$ | 260 | 15,000 | 24 |
| 2* | $(NH_4)_2HPO_4$ | 260 | 8,000 | 24 |
| 3* | $(NH_4)_2HPO_4 + Ca(OH)_2$ | 260 | 15,000 | 24 |

*Sea urchin (Diadema, rather than *Acanthaster planci*).

In the above-indicated tests the major concern was that in the exchange process the porous coral structure be retained in the resulting formed hydroxyapatite and whitlockite materials. Since there are certain crystal structural similarities between aragonite and apatite these similaritites obviously favor the desired morphological preservation. The Acanthaster spine material consists of single crystal calcite which upon hydrothermal phosphate exchange in accordance with this invention could result in ordered epitaxial growth of single crystal whitlockite. Since the external morphology is rhombohedral, similar to that of calcite, and its space group is also similar to that of calcite, structural or morphological control is also possible.

Synthetic materials of this invention are particularly useful as prosthetic materials not only because of their chemical and physical relationships to human bone but also because the materials of this invention can be prepared to have a substantially uniform pore size and a pore size within a selected range. Uniformity of pore size is of dominating importance in connection with prosthetic materials used for the ingrowth of living matter thereinto, e.g. repair of damaged bone or cartilage sections. Since the growth process must commence from the outer region of the implant, pores of diameter of less than a certain minimum, e.g. about 5–15 microns, would prevent inner regions from being supplied with the necessary nutrients for ingrowth even though the average pore size may be theoretically large enough for osteon formation. Thus the synthetic materials prepared in accordance with this invention provide ideal materials for prosthetic devices useful in

I claim:

1. Synthetic material useful as a biomaterial characterized by a substantially uniform pore volume in the range from about 10% to about 90% and having a microstructure characterized by a pronounced threedimensional fenestrate structure corresponding to the microstructure of the porous carbonate echinoderm or schleractinian coral skeletal material of marine life and providing a periodic minimal surface, said periodic minimal surface dividing the volume of said material into two interpenetrating regions, each of which is a single, multiply connected domain, said material having a substantially uniform pore size diameter and substantially uniform pore connections or openings in the range from about 5 microns to about 500 microns, said synthetic material being made up of a material selected from the group consisting of hydroxyapatite and whitlockite.

2. Synthetic material in accordance with claim 1 having the microstructure of echinoderm skeletal calcite and consisting essentially of whitlockite.

3. Synthetic material in accordance with claim 2 wherein said echinoderm skeletal calcite is echinoid spine calcite.

4. Synthetic material in accordance with claim 1 possessing the microstructure of coral skeletal aragonite and consisting essentially of hydroxyapatite.

5. Synthetic material in accordance with claim 4 said coral skeletal aragonite is Porites skeletal aragonite.

6. Synthetic material in accordance with claim 1 wherein said hydroxyapatite contains about 0.1–10% by weight carbonate.

7. Synthetic material in accordance with claim 1 wherein said whitlockite contains about 0.1–10% by weight carbonate.

8. Synthetic material in accordance with claim 1 having the microstructure of the calcite spine of *Acanthaster planci* and consisting essentially of whitlockite.

9. Synthetic material in accordance with claim 1 having the microstructure of the calcite spine of the sea urchin Diadema and consisting essentially of whitlockite.

10. Synthetic material in accordance with claim 1 possessing the microstructure of Goniopora skeletal aragonite and consisting essentially of hydroxyapatite.

11. Synthetic material in accordance with claim 10 wherein said hydroxyapatite contains about 0.1–10% by weight carbonate.

12. Synthetic material in accordance with claim 1 possessing the microstructure of Alveopora skeletal aragonite and consisting essentially of hydroxyapatite.

13. Synthetic material in accordance with claim 12 wherein said hydroxyapatite contains about 0.1–10% by weight carbonate.

14. Synthetic material in accordance with claim 1 wherein said marine life is scleractinian coral.

15. Synthetic material in accordance with claim 1 wherein said marine life is of the phylum Coelenterate.

16. Synthetic material in accordance with claim 1 wherein the carbonate of said porous skeletal material is aragonite or calcite.

17. Synthetic material in accordance with claim 1 possessing the microstructure of Acropora skeletal aragonite and consisting essentially of hydroxyapatite.

18. Synthetic material in accordance with claim 1 wherein said hydroxyapatite contains about 0.1–10% by weight carbonate.

19. Synthetic material in accordance with claim 1 wherein the microstructure is such that the synthetic material has the ratio of pore volume to the volume of solid of approximately 1 and has a cross-sectional diameter of both the pore and solid phase of about the same dimension ranging from about 5 microns to about 500 microns.

20. Synthetic material in accordance with claim 1 having a pore size in the range 40–200 microns.

21. Synthetic material in accordance with claim 1 having a pore size in the range 5–15 microns.

22. Synthetic material in accordance with claim 1 shaped or formed substantially into the shape of a cylinder.

23. Synthetic material in accordance with claim 1 shaped or formed substantially into the shape of a flat sheet.

24. Synthetic material in accordance with claim 1 shaped or formed substantially into the shape of a curved sheet.

25. Synthetic material in accordance with claim 1 shaped or formed substantially into the shape of a threaded or serrated screw-like form.

26. A method of converting porous carbonate skeletal material of marine life into a phosphate skeletal material possessing substantially the same microstructure of said carbonate skeletal material which comprises subjecting said porous carbonate skeletal material to hydrothermal chemical exchange with a soluble or solubilized phosphate, said hydrothermal chemical exchange being carried out at a temperature in the range from about 100°C. to about 600°C. and at an elevated pressure in the range about 1,500–100,000 psig for a period of time sufficient to convert said carbonate skeletal material to a phosphate skeletal material wherein the phosphate of said phosphate skeletal material is hydroxyapatite or whitlockite.

27. A method in accordance with claim 26 wherein said period of time is in the range from about 1 hour to about 2 weeks.

28. A method in accordance with claim 26 wherein the carbonate of said porous carbonate skeletal material is aragonite and wherein the phosphate of said phosphate skeletal material is hydroxyapatite.

29. A method in accordance with claim 28 wherein said phosphate skeletal material consists essentially of hydroxyapatite and a minor amount of carbonate is in the range 0.1% to about 10% by weight $CO_3$.

30. A method in accordance with claim 26 wherein the carbonate of said carbonate skeletal material is calcite and wherein the phosphate of said phosphate skeletal material is whitlockite.

31. A method in accordance with claim 30 wherein said phosphate skeletal material consists essentially of whitlockite and a minor amount of carbonate in the range 0.05% to about 5.0% by weight $CO_3$.

32. A method in accordance with claim 26 wherein said phosphate employed in the hydrothermal chemical exchange is $(NH_4)_2HPO_4$.

33. A method in accordance with claim 26 wherein said phosphate employed in the hydrothermal chemical exchange is $(NH_4)_2HPO_4$ and wherein $Ca(OH)_2$ is present during the hydrothermal chemical exchange.

34. A method in accordance with claim 26 wherein said phosphate employed in the hydrothermal chemical exchange is $CaHPO_4.2H_2O$ together with $(NH_4)_2HPO_4$.

35. A method in accordance with claim 26 wherein said phosphate employed in the hydrothermal chemical exchange is $3CaO.P_2O_5$.

36. A method in accordance with claim 26 wherein said phosphate employed in the hydrothermal chemical exchange is $CaHPO_4$ together with orthophosphoric acid $H_3PO_4$.

37. A method in accordance with claim 26 wherein the phosphate employed in the hydrothermal chemical exchange is $Ca(H_2PO_4)_2.H_2O$.

38. A method in accordance with claim 26 wherein the phosphate employed in the hydrothermal chemical exchange for reaction with the carbonate of said porous carbonate skeletal material is a phosphate selected from the group consisting of alkali metal phosphates, ammonium orthophosphates, calcium orthophosphates and acid phosphates thereof, orthophosphoric acid and hydrates thereof, and mixtures of weak acids with phosphates.

39. A method in accordance with claim 38 wherein said alkali metal phosphates are sodium orthophosphates.

40. A method in accordance with claim 38 wherein said alkali metal phosphates are potassium orthophosphates.

41. A method in accordance with claim 38 wherein said weak acid is acetic acid.

42. A method in accordance with claim 26 wherein the hydrothermal chemical exchange is carried out at a temperature in the range from about 180°C. to about 350°C.

43. A method in accordance with claim 26 wherein the hydrothermal chemical exchange is carried out at a pressure in the range from about 8,000 psi to about 15,000 psi.

44. A method in accordance with claim 26 wherein the hydrothermal chemical exchange is carried out for a period of time from about 12 hours to about 48 hours.

45. A method in accordance with claim 26 wherein the hydrothermal chemical exchange is carried out at a pressure in the range from about 8,000 psi to about 15,000 psi, for a period of time of from about 12 hours to about 48 hours and wherein the phosphate employed in said hydrothermal chemical exchange is derived from $(NH_4)_2HPO_4$.

* * * * *

UNITED STATES PATENT AND TRADEMARK OFFICE

CERTIFICATE EXTENDING PATENT TERM UNDER 35 U.S.C. § 156

PATENT NO.      :   3,929,971

DATED           :   December 30, 1975

INVENTOR        :   Della M. Roy

PATENT OWNER    :   Research Corporation Technologies

This is to certify that there has been presented to the

COMMISSIONER OF PATENTS AND TRADEMARKS an application under 35 U.S.C. § 156 for an extension of the patent term. Since it appears that the requirements of the law have been met, this certificate extends the term of the patent for the period of

TWO YEARS from the date of expiration of the original patent term with all rights pertaining thereto as provided by 35 U.S.C. § 156(b).

I have caused the seal of the Patent and Trademark Office to be affixed this 15th day of December 1994.

Bruce A. Lehman
Assistant Secretary of Commerce and
    Commissioner of Patents and Trademarks